G. L. FARMER.
Churn-Lid.

No. 211,980. Patented Feb. 4, 1879.

Witnesses:
A. O. Behel.
F. J. Sovereign

Inventor:
George L. Farmer
Per Jacob Behel
Atty

UNITED STATES PATENT OFFICE.

GEORGE L. FARMER, OF ROCKFORD, ILLINOIS.

IMPROVEMENT IN CHURN-LIDS.

Specification forming part of Letters Patent No. 211,980, dated February 4, 1879; application filed December 6, 1878.

*To all whom it may concern:*

Be it known that I, GEORGE L. FARMER, of the city of Rockford, in the county of Winnebago and State of Illinois, have invented a new and useful Improvement in Churn-Lids, of which the following is a specification:

This invention relates to fixing removable lids to vessels—such as churns or other vessels—requiring a close-fitting removable lid.

The object of this invention is to provide a close-fitting removable lid for vessels employed to contain substances requiring such lids; and in this instance I shall describe my improvement as employed in an end-over-end revolving churn, employed in churning milk to produce butter.

Figure 1:
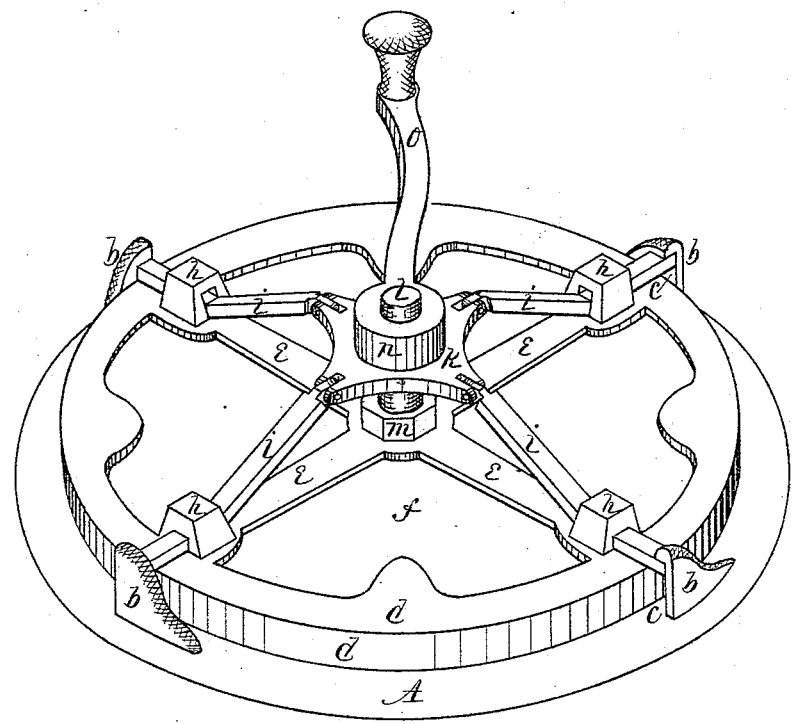
Figure 2:
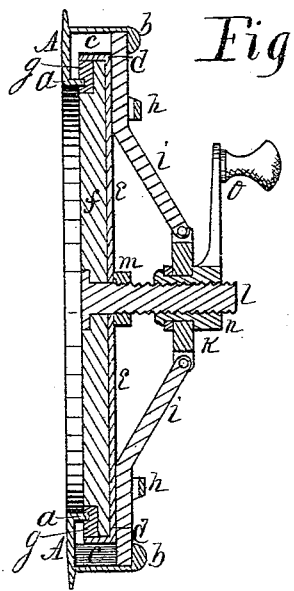
Figure 3:
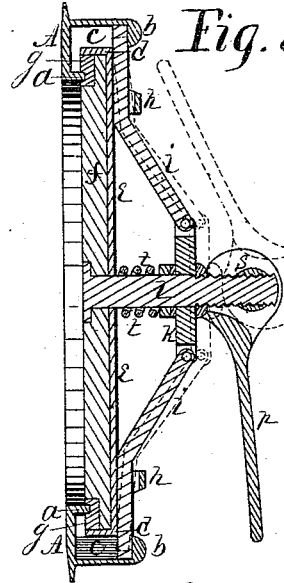

In the drawings, Figure 1 is an isometrical representation of a removable lid, in connection with the fixed ring portion of the head of a vessel. Fig. 2 is a vertical central section, cut centrally lengthwise through the cross-arms of the metallic ring of the removable lid, and on the same plane through the other parts. Fig. 3 is a vertical central section on the same plane as Fig. 2, and is designed to represent a slightly-modified form of my improvement.

In the figures, A is designed to represent the fixed portion of the head of a vessel, which in this instance is of metal, in disk-ring form, and having its outer edge adapted to enter the groove cut in the chine of the vessel, in the same manner as heads of vessels are received in the groove cut in their chines. This ring-head is provided with a central opening, around which, on the outside of the head, rises a rim, *a*, projecting above the plane of the ring-head. This ring-head is provided with outward-projecting ears *b*, which rise from its outer face, outside of the rim *a*, at proper intervals, on a circular line between its inner and outer edges. These ears are rabbeted on their vertical inner corners, as at *c*, having the outer portion overlapping the rabbeted portion, forming hooking ears adapted to receive a bolt-locking device to secure a removable lid in place on the ring-head.

*d* represents a metallic ring, of angle-iron form, in cross-section, and is provided with cross-arms *e*. This angle-iron rim with cross-arms receives the wooden lid *f* within the depending outer rim of the metallic angle-iron ring. The wooden lid *f* is rabbeted on its under face and outer edge, forming a groove, in which is fitted a packing-ring, *g*, made of any suitable material. This removable lid is of such relative size as to be freely received between the ears *c*, which rise from the fixed ring-head, and when placed on the open ring-head the packing-ring will rest on the outward uprising ring, *a*, on the fixed ring-head.

*h* are staple-formed loops that rise from the outer portion of the cross-arms *e*, or from the metallic ring *d*, with which they connect, and are adapted to freely receive the lever-clamping arms *i*. These lever-clamping arms are of the bent form represented in the drawings, the inner ends of which rise above the plane of the lid, and are connected by hinge-joint to a central spider, *k*. *l* is a screw-bolt, which is passed upward through the center of the wooden lid and through the center of the metallic cross-arms, above which it is fitted with a screw-nut, *m*, which fixes the wooden lid in the metallic ring of the removable lid. The screw-bolt *m* extends from the lid upward through the center of the spider *k*, and is fitted with a screw-nut, *n*, journaled to revolve in the spider, and held in place by a collar on the under side of the spider. The upper portion of this screw-nut *n* is provided with a lever crank-arm, *o*, by means of which the screw-nut can be made to ascend or descend on the screw-bolt. With this construction of the parts, and by means of the crank-arm, the spider is made to ascend on the screw-bolt, which movement will depress the outer ends of the lever-clamping arms, and when sufficiently depressed the lid is then put in place on the ring-head, between the rabbeted ears, and turned, in this instance, to the left until the outer ends of the lever-bolts pass into the rabbeted ears under their hooking outer ends. Then by means of the crank-arm the spider is depressed, which carries with it the inner ends of the lever-clamping arms, in which movement the angle formed on the outer portion of the lever-arms rests on the outer surface of the metallic ring of the lid, and causes the outer portion of the lever-arms to rise in contact with the hooking head of the rabbeted ears, and the continued downward movement of the spider will force the lid in close contact with the ring-head to prevent leakage. By reversing these movements the lid may be quickly removed.

This removable lid is especially adapted to churns of that class known as the "end-over-end revolving churn," in which the vessel is usually of the barrel form, suspended in a frame on trunnions projecting from its opposite sides about midway of its length.

In Fig. 3, I have represented the fixed disk ring-head and the removable lid in its main features, substantially the same as hereinbefore described; but in this figure I have omitted the operating crank arm $o$, and have substituted in its stead a lever-arm, $p$, fitted with an eccentric head journaled on the trunnion-formed projecting ends of the screw-nut $s$ in such a manner as to permit it to be thrown into the position of the dotted lines, which will permit the spider to rise and carry with it the inner ends of the lever-bolts, which will permit the lid to be removed. In this modification I employ a spring, (shown at $t$,) which surrounds the screw-bolt between the lid and the spider, the action of which will hold the spider pressed against the eccentric. This modification is of such construction that the free end of the lever-arm $p$ may be employed as a wrench to be moved in a plane parallel with the lid, to turn the screw-nut $s$ up or down on the screw-bolt, to regulate the acting force of the eccentric in depressing the spider.

I claim as my invention—

The combination, with the removable lid provided with lever-arms, of the central screw-bolt provided with screw-nut, operating to depress or elevate the inner ends of the lever-arms, to fix the removable lid in place on the ring-head, or to detach it therefrom as the crank-arm is moved to the right or left, substantially as and for the purpose hereinbefore set forth.

GEORGE L. FARMER.

Witnesses;
   THOMAS FERGUSON,
   A. O. BEHEL.